United States Patent Office 3,193,507
Patented July 6, 1965

3,193,507
METHOD OF CLEANING GLASS
Henry R. Jacobs, 2769 Sheridan Road, Evanston, Ill.
No Drawing. Filed Aug. 30, 1961, Ser. No. 134,845
1 Claim. (Cl. 252—170)

This invention relates to a novel cleaning solution and cleaning method for windows and the like. More particularly, this invention relates to the use of a liquid composition and a soft absorbent member or applicator of solid material such as a soft cloth moistened thereby which, as thus prepared, is capable of cleaning soil from a glass window pane in a wiping motion.

An effective cleaning agent for glass must have an affinity for glass greater than that possessed by the soiling material that is generally encountered, e.g., dust, dirt, grime, tars from tobacco smoke, waxes, greases and the like, generally referred to as "actual soil," yet not have so great an affinity as to be difficult in its own removal as far as its visibility is concerned and leave an "apparent soil." Also scrubbing should not be necessitated.

Most window cleaners heretofore known are applied to the glass in fluid form, generally in a way which involves a scrubbing action. Some are then permitted to dry on the glass while others are not. In either case, the actual soil is removed and the glass must then be polished dry and clear with a clean, dry cloth or the like as a final operation to remove "apparent soil."

In the present invention the cleaning agent lifts the soil from the glass surface very quickly since it has a much stronger affinity for the glass than the soil. It thereby is able to dislodge and replace soil competitively almost instantly without scrubbing. The loosened soil is thereby removed during the same wiping movement of the element in which the cleaning agent on the dampened applicator is applied. Moreover, any cleaning agent on the dampened cloth left on the window will not remain visible on the glass to leave a cloudy or smeared appearance.

It is a prime object of the present invention to provide a liquid composition which is used to moisten a soft cloth or the like and thereafter stroking the glass with the moistened cloth until the glass is clean, no further operation being necessary.

A further important object of this invention is to provide a liquid composition as a window cleaning agent which has an affinity for glass greater than average window soiling material, yet not so great that it cannot be easily removed therefrom.

A still further important object of this invention is to provide a liquid composition as a window cleaning agent which is capable of cleaning glass without leaving a visible light reflecting film thereon.

Another object of this invention is to provide a liquid composition in concentrated form which when properly diluted in a liquid solvent results in a window cleaning agent according to the preceding objects.

Still another object of this invention is to provide a new and novel method for cleaning glass and the like.

Still another object of this invention is to provide a highly efficient liquid window cleaning agent at low cost.

These and further objects of the invention will become readily apparent from the ensuing description of an embodiment of the invention and the appended claim.

During experimental work relating to the forces of menisci in a capillary tube of less than .25 mm. in diameter using various liquids including aqueous solutions, I attempted to shorten the process of cleaning the capillary tube required between each experimental determination. A strong antiseptic liquid appeared to be logical for such purpose and I selected such a solution consisting of one-half gram of 4-hexylresorcinol per liter of distilled water.

Subsequent experimental use of the capillary so cleaned gave curious results considered quite erratic from results previously obtained. Curiosity thus aroused, several materials including wetting agents were similarly tested, all tests being conducted at a controlled temperature of 37° C.

When liquid distilled water is permitted to form a meniscus in a glass capillary tube it was found that at a constant temperature a definite force is required to set the meniscus in motion from a static position. This force for convenience is referred to herein as "meniscus resistance." Now when an aqueous solution consisting of as little as $1/256$ gram of the commercially known wetting agent Aerosol OT (trademark of American Cyanamid Co.) in a liter of distilled water was tested in the same manner it was found that the meniscus resistance increased. As the concentration was increased in accordance with geometric proportion, it was found that the meniscus resistance also increased until the concentration reached approximately $1/2$ gram per liter. Continued increase in concentration thereafter resulted in a progressive decline in meniscus resistance until a concentration of about 4 grams per liter was reached at which concentration the meniscus resistance was approximately equal to that of distilled water. Other solutes such as 4-hexylresorcinol (Caprokol) and sodium oleate were tested in like manner. Owing to the limited solubility of hexylresorcinol in water a concentration greater than one gram per liter could not be so tested. The maximum value of meniscus resistance for sodium oleate was found to be about four times that of the hexylresorcinol while that of the Aerosol OT was found to be about twice as great. Curiously, all materials so tested possessed one property in common with each other for at a concentration of approximately $1/2$ gram per liter each reached its maximum value for meniscus resistance at that concentration. Viscosity of the solutions apparently is not a factor for no measurable change in viscosity of the solution with increased concentration was detected.

The above mentioned three materials have the ability to depress the surface tension of water but there is no indication that surface tension itself is significantly involved in the effects above described. It is well known that the curve relating concentration of a surface active agent to its surface tension is smooth and without inflections. The effects described herein have maxima, hence do not grow with surface tension lowering effects.

The above described experiments clearly show differences among the three materials. These differences are obviously due to differences in activity at the meniscus or at the air-glass-liquid junction comprising the meniscus. The fact that certain concentrations of solute in water exhibit these phenomena while lower and higher concentrations do not do so as well suggest that a "zone phenomenon" is involved, the nature of which is not understood.

Since the materials employed herein are all able to lower the surface tension of water, some of the effects observed might be due to activity of the air-liquid interface or to the liquid-glass interface, or both. Further, since the effects appear with motion of a column within a capillary, perhaps the molecules of the material employed require time to establish the concentrations at the interfaces that they are capable of maintaining in a state of equilibrium, and motion disrupts this state probably by lowering the concentration of the material at the interfaces through eddy currents behind the meniscus removing molecules from the interface and mixing them further behind the meniscus. Rapidly changing concentration at the interface would, in all probability, cause parallel changes in surface tension with consequent irregularity in motion.

The above suggests that there is adsorption of the solute to the glass and the greater the tenacity of this adsorption the greater the tendency to form apparent soiling. Where, as in the case of sodium oleate, the tenacity of adsorption is high, it is difficult to remove from the glass. Thus, a window having sodium oleate thereon would be difficult to polish because the cloudy or smeared effect (apparent soil) is hard to remove with a cloth. On the other hand if the tenacity of adsorption is too low then it will be unable to remove actual soil from the glass. However, in the case of 4-hexylresorcinol the tenacity of adsorption appears to be somewhat above that of actual soiling substances for it displaces them with ease, yet leaving no visually perceptible film on the glass.

The following examples are shown as illustrative of the invention:

Example 1

As a practical test for utility purposes a solution consisting of ½ gram of 4-hexylresorcinol (i.e., 0.05% by weight) was dissolved in a liter of distilled water at room temperature. An ordinary clean white soft cotton cloth as an applicator was moistened with this solution only to the condition where the cloth was damp (i.e., not dripping wet). The moistened cloth held by hand was stroked only once across a glass window pane having substantial or visible actual soil thereon. No subsequent wiping or polishing was performed. The stroked area on the glass was sparkling clean with no evidence of apparent soiling (i.e., visible cloudiness due to adsorption or deposit of 4-hexylresorcinol). Repeated use of the same dampened cloth gave the same result even when the treated cloth became virtually black with actual soil removed from the glass.

Example 2

When the same test described above for Example 1 was similarly performed except that each of the other two previously mentioned agents (sodium oleate and Aerosol OT) was substituted for the 4-hexylresorcinol, the actual soil was readily removed from the glass but apparent soil occurred as the glass was visibly cloudy due to reflected light from the agent deposited on the surface of the glass. Considerable difficulty was encountered, particularly in the case of sodium oleate to remove this apparent soil by repeated stroking with a clean soft cloth.

Example 3

When the above mentioned practical test of Examples 1 and 2 was repeated except that the concentration in each case was doubled, 4-hexylresorcinol gave the same result but the apparent soiling occurring in the cases of sodium oleate and Aerosol OT was somewhat greater. In the case of 4-hexylresorcinol the solubility in water reaches saturation at about 0.1% concentration by weight.

The concentration of 4-hexylresorcinol can be readily increased by introducing ethyl alcohol to the distilled water in an amount sufficient to attain the desired concentration as this compound is quite soluble in ethyl alcohol. However, solution concentrations of 4-hexylresorcinol above about 0.1% by weight (using alcohol-water mixture as a solvent) resulted in the appearance of some apparent soiling of the glass. On the other hand solution concentrations below 0.006% by weight of hexylresorcinol did not readily remove actual soil from the glass. Thus, the critical solution concentration limits for 4-hexylresorcinol are 0.006% to 0.1% by weight and the preferable range being 0.025% to 0.1% by weight in the above mentioned solvent or solvents.

As mentioned above 4-hexylresorcinol is quite soluble in ordinary ethyl alcohol (95% ethanol and 5% water). It is difficult for the consumer to dissolve the material in water to obtain a solution within the above mentioned critical limits of concentration and certainly more difficult to attain a solution having a concentration within the above stated preferred range. On the other hand to prepare the final solution for the user involves not only the high cost of liquid containers, but also the high cost of shipping a liquid which is principally water. In order to reduce these costs I have found that an alcoholic concentrate solution consisting of, for example, 10% by weight of 4-hexylresorcinol and 90% by weight of ordinary ethyl alcohol is practical. Thus, to a 10 gram portion of the concentrate, water is added sufficient to make two liters of the final solution having a concentration of 0.05% 4-hexylresorcinol. The presence of the alcohol in the final solution does not appear to affect the cleansing properties when used in accordance with Example 1. Methyl or propyl alcohol may be substituted for ethyl alcohol with similar results. Obviously other concentration ratios could be made and subsequently diluted accordingly.

While soft cloth of cotton as an applicator was preferably used to illustrate or demonstrate the use of the window cleaning agent of this invention, it is to be noted that other absorbent cellulosic materials can be used to obtain the same result where they exhibit a desirable affinity for soil. For example, wood fiber products, natural sponges are highly desirable. Resilient plastic foam type materials having absorbent properties like that of natural sponge might be used and also other materials having desirable soil absorbent properties, such as chamois, may be used as applicators. Furthermore, it is equally obvious that ceramic surfaces particularly those having a silica surface may be cleaned successfully by the hexylresorcinol cleaning agent solution of this invention.

Having thus described a preferred embodiment of the invention it can now be seen that the objects of the invention have been fully achieved and it must be understood that changes and modifications may be made which do not depart from the spirit of the invention nor from the scope thereof, as defined in the appended claim.

What is claimed is:

The method of cleaning the sprface of glass and silica surfaced ceramic articles for removing actual soil without leaving apparent soil thereon consisting of the steps of moistening a resilient and absorbent solid applicator with a liquid surface cleaning agent, said cleaning agent being a solution consisting of 0.006% by weight to 0.1% by weight of the compound hexylresorcinol in at least one solvent selected from the group consisting of water, methyl alcohol, ethyl alcohol and propyl alcohol, and stroking said surface with said moistened applicator until said surface is visibly clean.

References Cited by the Examiner

Soap and Sanitary Chemicals, September 1952, pages 48–49 and 105–106.

Condensed Chemical Dictionary, Rose, 5th Ed., 1956, Reinhold Pub. Corp., page 559.

Merck Index, Sixth Ed., 1952, Merck Pub. Co., page 496.

JULIUS GREENWALD, *Primary Examiner.*